United States Patent
Xie

(10) Patent No.: US 9,667,794 B2
(45) Date of Patent: May 30, 2017

(54) AGENT SERVICE CALL SWITCH SYSTEM AND METHOD IN CALL CENTRE

(71) Applicant: ZTE Corporation, Shenzhen, Guangdong (CN)

(72) Inventor: Hongkuan Xie, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 24 days.

(21) Appl. No.: 14/434,597

(22) PCT Filed: Aug. 5, 2013

(86) PCT No.: PCT/CN2013/080849
§ 371 (c)(1),
(2) Date: Apr. 9, 2015

(87) PCT Pub. No.: WO2014/063509
PCT Pub. Date: May 1, 2014

(65) Prior Publication Data
US 2015/0288820 A1 Oct. 8, 2015

(30) Foreign Application Priority Data

Oct. 23, 2012 (CN) .......................... 2012 1 0405968

(51) Int. Cl.
*H04M 3/50* (2006.01)
*H04M 3/523* (2006.01)
(Continued)

(52) U.S. Cl.
CPC .......... *H04M 3/5232* (2013.01); *H04L 12/16* (2013.01); *H04M 3/515* (2013.01);
(Continued)

(58) Field of Classification Search
CPC .... H04M 3/5183; H04M 3/51; H04M 3/5133; H04M 7/12; H04M 7/1205; H04M 15/55; H04L 12/66
(Continued)

(56) References Cited

U.S. PATENT DOCUMENTS

| 7,864,942 B2 | 1/2011 | Knott | |
|---|---|---|---|
| 2002/0187777 A1* | 12/2002 | Osterhout | H04M 3/54 455/417 |

(Continued)

FOREIGN PATENT DOCUMENTS

| CN | 101150419 A | 3/2008 |
|---|---|---|
| CN | 101651756 A | 2/2010 |

(Continued)

OTHER PUBLICATIONS

Supplementary European Search Report in European application No. 13849647.6, mailed on Sep. 23, 2015.

(Continued)

*Primary Examiner* — Ahmad F Matar
*Assistant Examiner* — Jirapon Intavong
(74) *Attorney, Agent, or Firm* — Oppedahl Patent Law Firm LLC

(57) ABSTRACT

An agent service call switch system and method in a call center are provided, which includes that a VCM modifies a Data Base and adds a service number for switch in an agent service number list; an agent selects a PSTN number or a PLMN number as a service number after switch, and sends an update message to a CTI module to update the service number of the agent; the CTI module sends a logout message about a service number before switch, namely a VOIP number, to an ACD module; the agent sends an unregister message to the ACD module to unregister the VOIP number; the ACD module sends an acknowledgement message to the (Continued)

agent and the CTI module respectively, so as to complete the switch of the service number. The system and method achieve seamless and smooth switch when an agent is temporarily off the seat, implement switch of an agent service call, meet the disaster recovery requirement of an audio channel of the agent service and realize agent service continuity, and meet the construction and maintenance requirement of a customer for low system investment and easy operation.

16 Claims, 3 Drawing Sheets

(51) Int. Cl.
*H04M 3/51* (2006.01)
*H04L 12/16* (2006.01)

(52) U.S. Cl.
CPC ....... *H04M 3/5133* (2013.01); *H04M 3/5183* (2013.01); *H04M 3/5191* (2013.01); *H04M 3/523* (2013.01)

(58) Field of Classification Search
USPC .................................................... 379/265.01
See application file for complete search history.

(56) References Cited

U.S. PATENT DOCUMENTS

| | | | |
|---|---|---|---|
| 2003/0002479 | A1 | 1/2003 | Vortman |
| 2003/0059028 | A1* | 3/2003 | Lee ..................... H04M 3/5191 |
| | | | 379/265.01 |
| 2005/0047579 | A1 | 3/2005 | Salame |
| 2005/0096029 | A1* | 5/2005 | Pelaez .................... H04M 3/54 |
| | | | 455/419 |
| 2008/0008308 | A1 | 1/2008 | Knott |
| 2010/0136970 | A1* | 6/2010 | Mui .................... H04L 65/1073 |
| | | | 455/435.1 |

FOREIGN PATENT DOCUMENTS

| | | |
|---|---|---|
| CN | 101945180 A | 1/2011 |
| EP | 2451118 A1 | 5/2012 |
| WO | 2006062854 A2 | 6/2006 |

OTHER PUBLICATIONS

International Search Report in international application No. PCT/CN2013/080849, mailed on Oct. 31, 2013.
English Translation of the Written Opinion of the International Search Authority in international application No. PCT/CN2013/080849, mailed on Oct. 31, 2013.

* cited by examiner

AGENT SERVICE CALL SWITCH SYSTEM AND METHOD IN CALL CENTRE

TECHNICAL FIELD

The disclosure relates to the field of communications, and in particular to an agent service call switch system and method in a call centre.

BACKGROUND

A call centre system is mainly targeted at enterprise customers to provide consultations, help, complaints and other related services, and it has become a main communication method between the enterprise and customer. As a main customer-oriented service window and sales window of the enterprise, a call centre system is required to be able to provide services and solve problems for customers timely and efficiently. Thus, the call centre system is required to have better robustness and flexibility, and be able to be prepared for any emergency; besides, it is required to improve the flexibility of system application while reducing and even avoiding influence on the customer.

At present, the common agent voice channel emergency solution of the call centre system has a few disadvantages, and it is implemented basically by adopting disaster recovery agents, an agent system of one call with multiple vibrations and other modes; the disaster recovery agents cannot be realized when there are not enough agents; or, it is difficult to utilize the above solution to realize the agent service continuity in the case where the call centre can not support one call with synchronous vibration. Besides, the requirement for continuous services cannot be met in the case where a telephone operator is off the seat. The enterprise urgently needs a switch solution which is simple to implement, easy to operate and relatively low in investment cost, and can fast implement a seamless switch of agent service calls.

SUMMARY

The embodiments of the disclosure provide an agent service call switch system and method in a call centre, so as to solve the problem in the prior art that services cannot be provided in the case where a telephone operator is off the seat.

To solve the above technical problem, the technical solutions of the disclosure are implemented as follows.

An agent service call switch system in a call centre is provided, which includes a real-time Voice Channel Switching Management Unit (VCM) of an agent, a Computer Telecommunication Integration (CTI) module, an Automatic Call Distributor (ACD) module and the agent; wherein
  the VCM is configured to modify a Data Base (DB), and to add a service number for switch in an agent service number list, wherein the service number includes a Voice Over Internet Phone (VOIP) number, a Public Switched Telephone Network (PSTN) number and a Public Land Mobile Network (PLMN) number;
  the agent selects a service number after switch as a PSTN number or a PLMN number, and sends an update message to the CTI module to update the service number of the agent;
  the CTI module sends a logout message about a service number before switch, namely a VOIP number, to the ACD module;
  the agent sends an unregister message to the ACD module to unregister the VOIP number; and
  the ACD module sends an acknowledgement message to the agent and the CTI module respectively, to complete switch of the service number from the VOIP number to the PSTN number or the PLMN number.

In an embodiment, the agent may select the service number after switch as a VOIP number, and send an update message to the CTI module to update the service number of the agent;
  the CTI module may send a login message about the VOIP number to the ACD module;
  the agent may send a register message to the ACD module to register the VOIP number;
  the ACD module may send an acknowledgement message to the agent and the CTI module respectively, to complete switch of the service number from the PSTN number or the PLMN number to the VOIP number.

In an embodiment, when the agent has a function of automatically switching a service number, the agent may automatically select a service number from the agent service number list; when the agent does not have the function of automatically switching a service number, a service number may be specified by the VCM.

In an embodiment, after the VCM modifies the DB, the VCM may send a synchronization request message to an Operation Administration and Maintenance (OAM) module; and
  after the OAM module receives the synchronization request message, the OAM module may acquire synchronization information from the DB, and send the synchronization information to real-time data files of the CTI module and the ACD module to complete a synchronous update.

In an embodiment, when a user logs in or out the VCM, the VCM may acquire unsynchronized data, and reminds the user to synchronize the unsynchronized data; then according to selection of the user, the unsynchronized data immediately is synchronized immediately, or synchronized after being checked and/or revised.

An agent service call switch method in a call centre is provided, which includes that:
  the VCM modifies the DB, and adds a service number for switch in an agent service number list, wherein the service number includes a VOIP number, a PSTN number and a PLMN number;
  the agent selects a service number after switch as a PSTN number or a PLMN number, and sends an update message to a CTI module to update the service number of the agent;
  the CTI module sends a logout message of a service number before switch, namely a VOIP number, to an ACD module;
  the agent sends the unregister message to the ACD module to unregister the VOIP number; and
  the ACD module sends an acknowledgement message to the agent and the CTI module respectively, to complete switch of the service number from the VOIP number to the PSTN number or the PLMN number.

After completing the switch of the service number from the VOIP number to the PSTN number or the PLMN number, the method may further include that:
  the agent selects the service number after switch as a VOIP number, and sends an update message to the CTI module to update the service number of the agent;
  the CTI module sends a login message about the VOIP number to the ACD module;

the agent sends a register message to the ACD module to register the VOIP number;

the ACD module sends an acknowledgement message to the agent and the CTI module respectively, to complete switch of the service number from the PSTN number or the PLMN number to the VOIP number.

In an embodiment, when the agent has the function of automatically switching a service number, the agent may automatically select a service number from the agent service number list; when the agent does not have the function of automatically switching a service number, the service number may be specified by the VCM.

In an embodiment, after the VCM modifies the DB, the method may further include that:

the VCM sends a synchronization request message to an OAM module;

after the OAM module receives the synchronization request message, the OAM module acquires the synchronization information from the DB, and sends the synchronization information to the real-time data files of the CTI module and the ACD module to complete the synchronous update.

In an embodiment, when a user logs in or out the VCM, the VCM acquires unsynchronized data, and reminds the user to synchronize the unsynchronized data; then according to selection of the user, the unsynchronized data immediately is synchronized immediately, or synchronized after being checked and/or revised.

The disclosure has the following beneficial effects:

the system and method of the disclosure implement seamless and smooth switch in the case where an agent is temporarily off the seat, implement the switch of an agent service call, meet the disaster recovery requirement of an audio channel of the agent service and realize the agent service continuity, and meet the construction and maintenance requirement of a customer for low system investment and easy operation.

DETAILED DESCRIPTION

The disclosure is further elaborated below in combination with the accompanying drawings and embodiments. It should be understood that specific embodiments described here are only used for illustrating the disclosure and not intended to limit the disclosure.

Embodiments of the disclosure implement a function of switching an agent service call by making a real-time Voice Channel switching management units (VCM) of an agent interact with a database (DB) and an Operation Administrator Maintains (OAM) module, modifying service call information corresponding to the agent in the DB, synchronizing the information to a Computer Telecommunication Integration (CTI) module in real time, and controlling the information through the CTI module and an Automatic Call Distributor (ACD) module.

Figure 1:
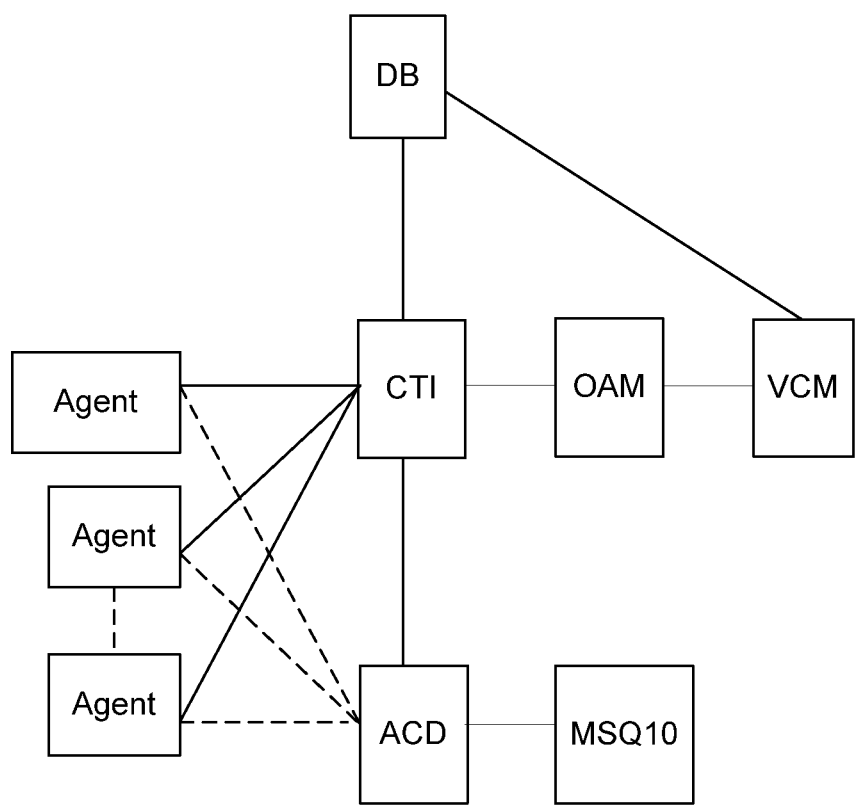
FIG. 1 is a structural diagram of an agent service call switch system in a call centre according to an embodiment of the disclosure.

As shown in FIG. 1, an embodiment of the disclosure relates to an agent service call switch system in a call centre, which includes:

a VCM, which is connected with a DB of the call centre, and configured to inquire and modify the DB, and send synchronous data to an OAM module and a CTI module, so as to implement a function of managing an agent service call in real time; the VCM is a client device, and supports interaction with the OAM module, the CTI module and others systems in the call centre through a webservice interface, a Telephony Service Application Programming Interface (TSAPI) and a private interface; the VCM may employ a Borland Database Engine (BDE) or an Open Database Connectivity data source interface to inquire, modify or add a specific agent service number, namely add a service number for switch to an agent service number list, wherein the service number includes a Voice over Internet Protocol (VOIP) number, a Public Switched Telephone Network (PSTN) number and a Public Land Mobile Network (PLMN) number;

the CTI module, which is configured to control routing processing and an agent state of the call centre system; the device provides a Computer Supported Telecommunications Applications (CSTA) protocol interface and the TSAPI protocol interface, and is configured to control routing processing and an agent state of the call centre system;

an ACD module, which is configured to control calls of the call centre system; the device is developed based on an intelligent network system, provides a Session Initiation Protocol (SIP) protocol interface, and is configured to accept register of a terminal, and allocate and control voice channels; besides, the ACD module also connects with a core network switching device (MSQ10) through the SIP protocol, so as to make and receive calls;

the OAM module, which is configured to process synchronous distribution of routing, skills and other real-time data, wherein the related data come into effect in real time after synchronization; the related data come into effect in real time after being synchronized through a private WINNT TCP interface based on Transmission Control Protocol/Internet Protocol (TCP/IP);

the DB, which stores data of the call centre system, stores routing policy information, agent information, operation diary data, record data and so on, and provides running data support for the call centre system;

the agent, which is a terminal device providing a manpower service, and added with a mechanism of automatically switching a service number and a mechanism of selecting a system login service number; the device has a function of answering and recording an incoming call and can be used with a common Personal Computer (PC) or a laptop, and can also be used separately; the agent is connected with the ACD module through the SIP interface, and accepts channel distribution and call control from the ACD module; the agent is connected with the CTI module through the TSAPI interface, and accepts state control and routing control from the CTI module.

The service number of the agent is automatically switched from a VOIP number to a PSTN number or a PLMN number, which includes the following steps:

Step A: the agent sends a Set busy message to the CTI module; the agent is in a set-busy and out-of-service state;

Step B: the agent selects a switch target which is a PSTN/PLMN service number, and sends an update message or a register message to the CTI module through the TSAPI protocol to update the service number of the agent; the function of automatically switching a service number of the agent is a kind of agent authority definition, and requires the agent to log in again to take effect. A specific agent (the one with the function of automatically switching a service number) is set whether to support the function of automatically switching of the agent; if support, the agent can automatically select a service number from the agent service number list; or else, it is necessary for the VCM to specify a service desk number;

Step C: the CTI module sends a logout message about a VOIP service call to the ACD module through the CSTA protocol;

Step D: the agent sends an unregister message to the ACD through the SIP protocol to unregister the original VOIP service number;

Step E: the ACD sends an acknowledgement (ACK) message to the agent;

Step F: the ACD sends an ACK message to the CTI module; and

Step G: the agent completes the switch of the service number from the VOIP number to the PSTN/PLMN number.

After the service number of the agent is switched to the PLMN number, that is, the service number of the agent is a mobile phone number, the agent can still provide service in an off state; thus, the service time of the telephone operator can be increased, and the service capability of the agent can be improved as far as possible when there are not enough telephone operators.

The service number of the agent is automatically switched from the PSTN/PLMN number to the VOIP number, which includes the following steps:

Step A: the agent sends a Set busy message to the CTI module to set a busy state; the agent is in a set-busy and out-of-service state;

Step B: the agent selects a switch target which is a VOIP service number, and sends an update message to the CTI module through the TSAPI protocol to update the service number of the agent;

Step C: the CTI module sends a login message about a VOIP service call to the ACD module through the CSTA protocol;

Step D: the agent sends a register message to the ACD through the SIP protocol to register;

Step E: the ACD module sends an ACK message to the agent;

Step F: the ACD module sends an ACK message to the CTI module; and

Step G: the agent completes the switch of the service number from the PSTN/PLMN number to the VOIP number.

When an agent having the function of automatically switching a service number logs in, the agent can select the type of the login number, that is, it can select a VOIP number, a PSTN number or a PLMN number as a service number; When an agent not having the function of automatically switching the service number logs in, it automatically selects a VOIP number as a service number; when it is needed to switch the service number, it is required to specify a service desk number by the VCM, that is, to specify the service number after switch.

In addition, the VCM also has a data synchronizing function, specifically including that:

the VCM sends a synchronization request message to the OAM module through the webservice interface or the TSAPI interface;

after receiving the synchronization request message, the OAM module acquires from the DB an agent target service desk number and other synchronization information, and sends the synchronization information to local real-time data files of the CTI module and the ACD module; after synchronization is successful, the OAM module returns an ACK message to the VCM. This mechanism utilizes the existing OAM synchronization mechanism of the call centre system to process. After synchronous update, a new service number will be used in the next call.

The above update operation can be used for the VCM to uniformly update the agent service number lists of all the agents; for example, after an administrator uniformly configures the agent service number lists of all the agents, it is not necessary to require each agent to synchronize separately since an uniform update operation has been performed.

In addition, the VCM also has a function of reminding of unsynchronized data, specifically including that:

when the agent logs in or out the VCM system, the VCM checks a data synchronization table of the data base, acquires the identified unsynchronized data, and reminds a user that there are still unsynchronized data. The user may select to synchronize the data immediately or synchronize the data after checking and revising them.

Figure 2:
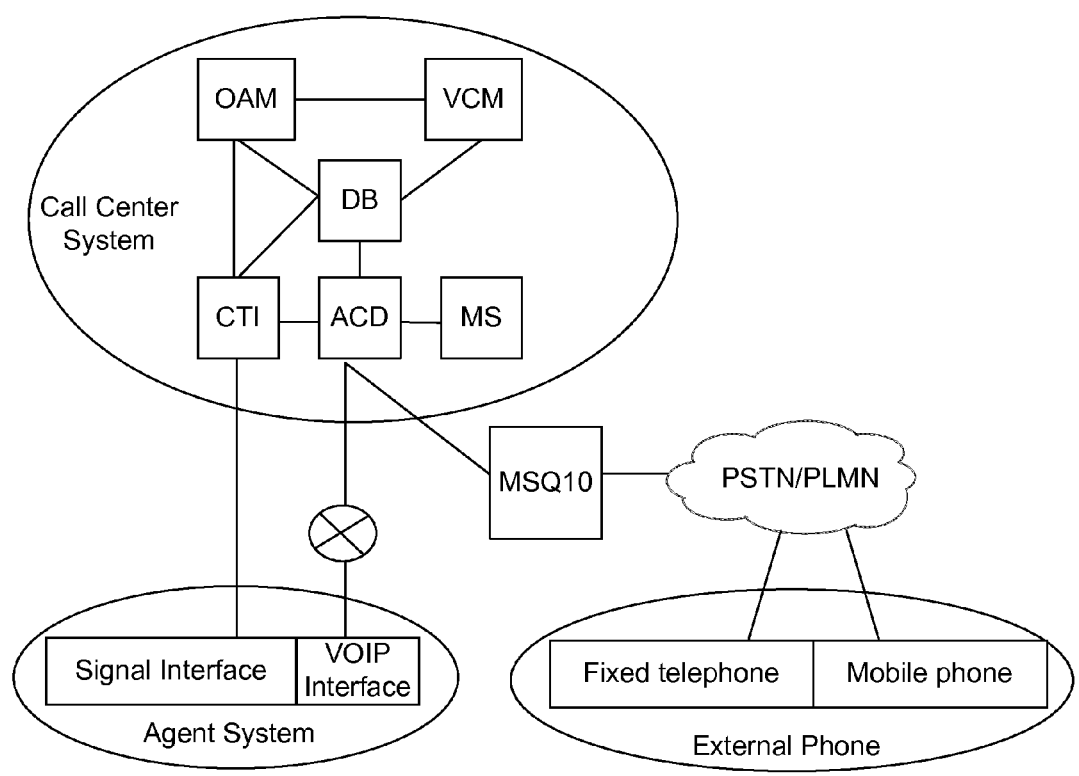
FIG. 2 is a service structure diagram of an agent service call switch system in a call centre according to an embodiment of the disclosure.

As shown in FIG. 2, an application scenario of an seamless switch system for an agent service call in a call centre is elaborated in combination with the service structure diagram of an embodiment of the disclosure.

Step 201 includes that when the call centre system runs normally, a core network accessing device (MSQ10) directs a user call admission route to the ACD module, and modules of the system complete service processes of the call centre to provide services for the user;

Step 202 includes that when the system has a telephone traffic failure or needs to answer the call in the off state, the administrator may switch agent voice channels through the VCM; the telephone operator with the authority of automatically switching voice channels may complete a voice channel switch request to the ACD module/CTI module through a function of switching agent interface voice channels;

Step 203 includes that after completing the switch of the agent voice channels, a user call accesses the ACD module through the MSQ10; the ACD module sends a request to the CTI module to acquire agent information; the CTI module returns the agent information and locks the agent state;

Step 204 includes that the ACD module acquires the PSTN/PLMN number of the agent, and calls this number through the MSQ10; the MSQ10 informs the ACD module after receiving an answer message from a terminal;

Step 205 includes that the ACD module informs the user, and completes the switch of media channels; a PSTN/PLMN phone of the agent connects with a phone of the user; and Step 206 includes that the agent provides telephone services.

Figure 3:
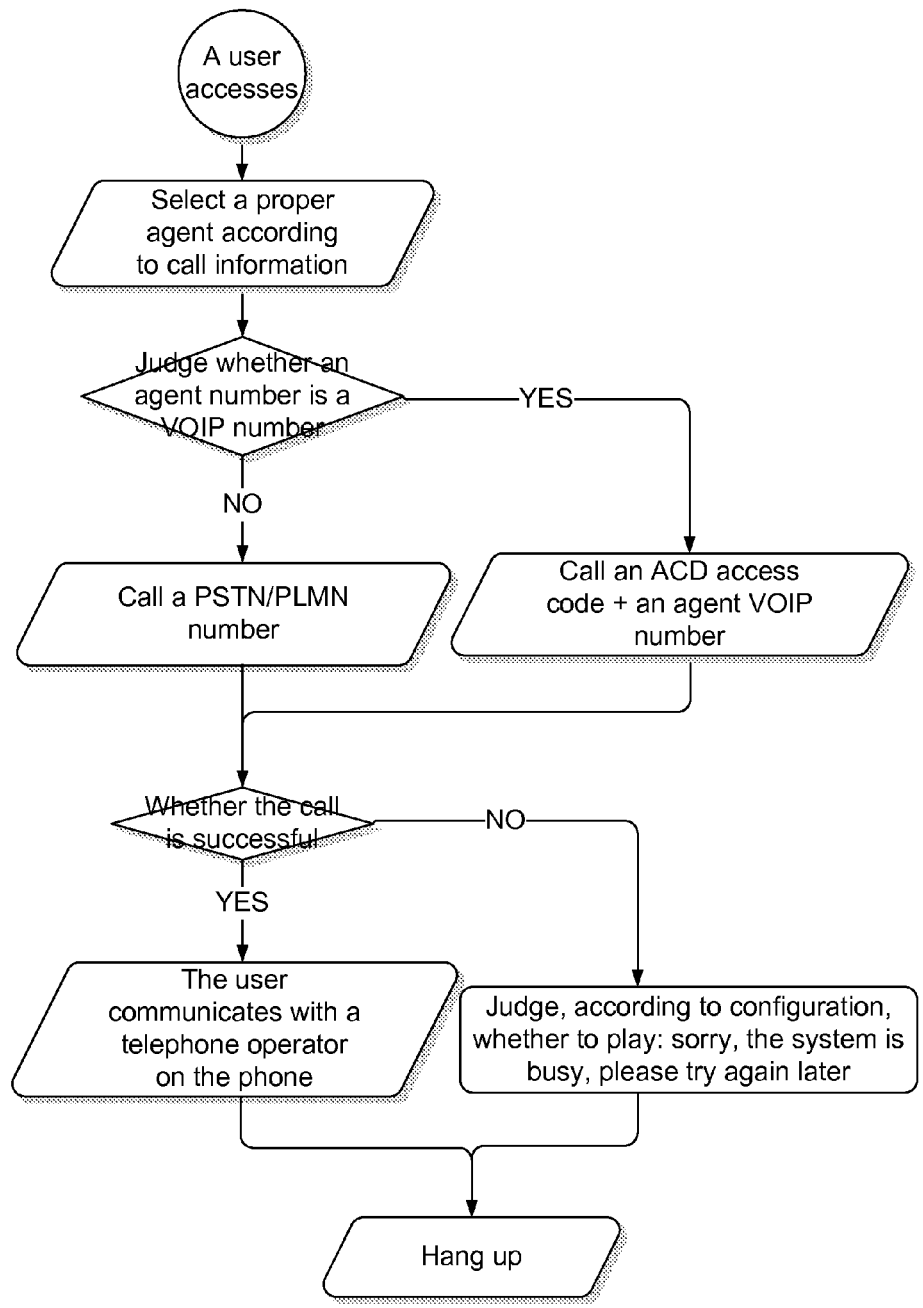
FIG. 3 is a flowchart of switch of a service number of an agent service call switch system in a call centre according to an embodiment of the disclosure.

As shown in FIG. 3, an access processing flow of the seamless switch system for an agent service call in a call centre is elaborated in combination with the service flowchart of an embodiment of the disclosure.

Step 301 includes that a user dials a service access code, and the call is sent to a platform through a core network device;

Step 302 includes that a CTI system selects a proper agent according to call information, and informs the ACD of the agent information;

Step 303 includes that the ACD module judges the type of an agent number; if it is a VOIP number, Step 304 is then executed; if it is a PSTN/PLMN number, Step 305 is then executed;

Step 304 includes that the ACD module calls an ACD access code+the VOIP number, Step 306 is then executed;

Step 305 includes that the ACD module calls the PSTN/PLMN, Step 306 is then executed;

Step 306 includes that whether the call is successful is judged; if successful, Step 307 is executed; or else, Step 308 is executed;

Step 307 includes that after the call continuation is successful, the ACD module controls to complete media switch, and implements communication between the agent and the user; Step 309 is executed;

Step 308 includes that when the call is failed, the ACD module judges, according to system configuration, whether to play access failure guidance voice to the user; Step 309 is then executed; and Step 309 includes that the user hangs up or the system automatically hangs up, and the flow ends.

It can be seen from the above embodiments that the disclosure introduces the VCM, achieves seamless and smooth switch in the case where a system is in emergency and an agent is temporarily off the seat, implements the switch of an agent service call, meets the disaster recovery requirement of an audio channel of the agent service and realizes the agent service continuity, and meets the construction and maintenance requirement of a customer for low system investment and easy operation.

The above are only the embodiments of the disclosure and not intended to limit the scope of the claims of the disclosure.

What is claimed is:

1. An agent service call switch system in a call centre, comprising a real-time Voice Channel Switching Management Unit (VCM) of an agent, a Computer Telecommunication Integration (CTI) module, an Automatic Call Distributor (ACD) module and the agent;
   wherein the VCM is configured to modify a Data Base (DB), and to add a service number for switching in an agent service number list, wherein the service number comprises a Voice Over Internet Phone (VOIP) number and a Public Land Mobile Network (PLMN) number;
   the agent selects the PLMN number as a service number after switching, and sends an update message to the CTI module through a Telephony Service Application Programming Interface (TSAPI) protocol to update the service number of the agent;
   the CTI module sends a logout message about a service number before switching, namely a VOIP number, to the ACD module through a Computer Supported Telecommunications Applications (CSTA) protocol;
   the agent sends an unregister message to the ACD module through a Session Initiation Protocol (SIP) protocol to unregister the VOIP number;
   the ACD module sends an acknowledgement message to the agent;
   the CTI module respectively, to complete switching of the service number from the VOIP number to the PLMN number; and
   after completing the switch of the agent voice channels, when a user call accesses the ACD module; the ACD module acquires the PLMN number of the agent, and calls PLMN number of the agent.

2. The system according to claim 1, wherein the agent selects the service number after switching as a VOIP number, and sends an update message to the CTI module to update the service number of the agent;
   the CTI module sends a login message about the VOIP number to the ACD module;
   the agent sends a register message to the ACD module to register the VOIP number;
   the ACD module sends an acknowledgement message to the agent and the CTI module respectively, to complete switching of the service number from the PLMN number to the VOIP number.

3. The system according to claim 1, wherein when the agent has a function of automatically switching a service number, the agent automatically selects a service number from the agent service number list; when the agent does not have the function of automatically switching a service number, a service number is specified by the VCM.

4. The system according to claim 1, wherein after the VCM modifies the DB, the VCM sends a synchronization request message to an Operation Administration and Maintenance (OAM) module; and
   after the OAM module receives the synchronization request message, the OAM module acquires synchronization information from the DB, and sends the synchronization information to real-time data files of the CTI module and the ACD module to complete a synchronous update.

5. The system according to claim 4, wherein when a user logs in or out the VCM, the VCM acquires unsynchronized data, and reminds the user to synchronize the unsynchronized data; then according to selection of the user, the unsynchronized data immediately is synchronized immediately, or synchronized after being checked and/or revised.

6. An agent service call switch method in a call centre, comprising:
   modifying, by a real-time Voice Channel Switching Management Unit (VCM) of an agent, a Data Base (DB), and adding a service number for switching in an agent service number list; wherein the service number comprises a Voice Over Internet Phone (VOIP) number and a Public Land Mobile Network (PLMN) number;
   selecting, by the agent, the PLMN number as a service number after switching, and sending an update message to a Computer Telecommunication Integration (CTI) module through a Telephony Service Application Programming Interface (TSAPI) protocol to update the service number of the agent;
   sending, by the CTI module, a logout message about a service number before switching, namely a VOIP number, to an Automatic Call Distributor (ACD) module through a Computer Supported Telecommunications Applications (CSTA) protocol;
   sending, by the agent, an unregister message to the ACD module through a Session Initiation Protocol (SIP) protocol to unregister the VOIP number; and
   sending, by the ACD module, an acknowledgement message to the agent and the CTI module respectively, to complete switching of the service number from the VOIP number to the PLMN number;

after completing the switch of the agent voice channels, when a user call accesses the ACD module; acquiring, by the ACD module, the PLMN number of the agent, and calling, by the ACD module, the PLMN number of the agent.

7. The method according to claim 6, after completing the switch of the service number from the VOIP number to the PLMN number, the method further comprising:

selecting, by the agent, the service number after switching as a VOIP number, and sending an update message to the CTI module to update the service number of the agent;

sending, by the CTI module, a login message about the VOIP number to the ACD module;

sending, by the agent, a register message to the ACD module to register the VOIP number; and sending, by the ACD module, an acknowledgement message to the agent and the CTI module respectively, to complete switching of the service number from the PLMN number to the VOIP number.

8. The method according to claim 6, wherein when the agent has a function of automatically switching a service number, the agent automatically selects a service number from the agent service number list; when the agent does not have the function of automatically switching a service number, a service number is specified by the VCM.

9. The method according to claim 6, after the VCM modifies the DB, the method further comprising:

sending, by the VCM, a synchronization request message to an Operation Administration and Maintenance (OAM) module;

after the OAM module receives the synchronization request message, acquiring, by the OAM module, synchronization information from the DB, and sending the synchronization information to real-time data files of the CTI module and the ACD module to complete a synchronous update.

10. The method according to claim 9, wherein when a user logs in or out the VCM, the VCM acquires unsynchronized data, and reminds the user to synchronize the unsynchronized data; then according to selection of the user, the unsynchronized data immediately is synchronized immediately, or synchronized after being checked and/or revised.

11. The system according to claim 2, wherein when the agent has a function of automatically switching a service number, the agent automatically selects a service number from the agent service number list; when the agent does not have the function of automatically switching a service number, a service number is specified by the VCM.

12. The system according to claim 2, wherein after the VCM modifies the DB, the VCM sends a synchronization request message to an Operation Administration and Maintenance (OAM) module; and after the OAM module receives the synchronization request message, the OAM module acquires synchronization information from the DB, and sends the synchronization information to real-time data files of the CTI module and the ACD module to complete a synchronous update.

13. The system according to claim 12, wherein when a user logs in or out the VCM, the VCM acquires unsynchronized data, and reminds the user to synchronize the unsynchronized data; then according to selection of the user, the unsynchronized data immediately is synchronized immediately, or synchronized after being checked and/or revised.

14. The method according to claim 7, wherein when the agent has a function of automatically switching a service number, the agent automatically selects a service number from the agent service number list; when the agent does not have the function of automatically switching a service number, a service number is specified by the VCM.

15. The method according to claim 7, after the VCM modifies the DB, the method further comprising:

sending, by the VCM, a synchronization request message to an Operation Administration and Maintenance (OAM) module;

after the OAM module receives the synchronization request message, acquiring, by the OAM module, synchronization information from the DB, and sending the synchronization information to real-time data files of the CTI module and the ACD module to complete a synchronous update.

16. The method according to claim 15, wherein when a user logs in or out the VCM, the VCM acquires unsynchronized data, and reminds the user to synchronize the unsynchronized data; then according to selection of the user, the unsynchronized data immediately is synchronized immediately, or synchronized after being checked and/or revised.

* * * * *